United States Patent [19]
Green

[11] Patent Number: 5,692,458
[45] Date of Patent: Dec. 2, 1997

[54] METHOD AND SYSTEM FOR OXIDATION OF VOLATILE ORGANIC COMPOUNDS USING AN INTERNAL COMBUSTION ENGINE

[76] Inventor: Edward F. Green, 330 Flat Roof Mill Rd., East Swanzey, N.H. 03446

[21] Appl. No.: 578,046

[22] Filed: Dec. 26, 1995

[51] Int. Cl.$^6$ .............. F02B 63/00; F02B 43/08
[52] U.S. Cl. .................. 123/2; 123/3; 123/527
[58] Field of Search .................. 123/527, 3, 2; 588/900

[56] References Cited

U.S. PATENT DOCUMENTS

| | | | |
|---|---|---|---|
| 4,400,396 | 8/1983 | Evans | 60/274 |
| 4,566,278 | 1/1986 | Force | 123/527 |
| 4,681,072 | 7/1987 | Pouring | 123/1 A |
| 4,846,134 | 7/1989 | Perry et al. | 123/525 |
| 5,149,500 | 9/1992 | Brahmbhatt et al. | 422/31 |
| 5,159,899 | 11/1992 | Dobrzynski | 123/3 |
| 5,453,210 | 9/1995 | Bardasz et al. | 252/18 |
| 5,501,185 | 3/1996 | King et al. | 123/527 |

Primary Examiner—Erick R. Solis
Attorney, Agent, or Firm—George W. Dishong

[57] ABSTRACT

The present invention is a system and method for oxidation of volatile organic compounds which is stored or held in a suitable storage structure such as an accumulation tank. The volatile organic compound stored in the accumulation tank is taken into the intake port of an operating internal combustion engine wherein the operating and internal combustion engine reduces the volatile organic compounds into carbon dioxide and water which appears in the exhaust gases of the operating engine.

6 Claims, 2 Drawing Sheets

METHOD AND SYSTEM FOR OXIDATION OF VOLATILE ORGANIC COMPOUNDS USING AN INTERNAL COMBUSTION ENGINE

BACKGROUND OF THE INVENTION

1. Field of the Invention

The present invention relates generally to an apparatus or system that completes the oxidation of a residual volatile organic compound and more particularly to the operation of an internal combustion engine that reduces a volatile organic compound to a non-hazardous state.

2. Description of the Related Art

The recovery or destruction of volatile organic compounds, (hereinafter referred to as "VOCs"), has become an increasingly important aspect to industry in recent years. Government regulations have been passed that place strict standards on the release of VOC's into the environment. For example, in the new legislation, (which takes effect in December 1997), the United States Government has limited the emission of ethylene oxide (referred to as "EO"), to levels less than 1.0 parts per million (ppm).

Presently, acidic water towers may be used to reduce concentrated emissions of EO. The acidic water tower has a large surface area in which a chemical reaction converts EO to ethylene glycol. Sulfuric acid is the typical acid that reacts with the EO. The chemical conversion is hazardous because it requires the handling, containment, and presence of a concentrated acid. In addition, there is a substantial increase in complexity and expense because of the requirement of extra equipment, including piping and instrumentation associated with an acidic water tower. These systems also require the disposal of large volumes of highly acidic ethylene glycol.

Direct combustion (flare) systems are also used. These are expensive to install and consume and waste a great deal of energy. A catalytic scavenger is presently utilized to reduce lower level EO emissions. Large volumes of air and the EO are pumped through the scavenger. A catalytic conversion reduces EO into water and carbon dioxide by flameless oxidation using copper oxide. These systems are also expensive to install and waste a lot of energy.

U.S. Pat. No. 5,149,500, issued to Brahmbhatt et al., discloses and claims a recovery process for sterilizing gas mixtures. The invention utilizes a condenser and disposal unit to recover the sterilizing agent, typically EO. The disposal unit may be either a catalytic combustion for lower levels, or scrubbing means for higher levels.

Ethylene oxide is considered a carcinogen and is suspect in creating chromosomal aberrations. The Environmental Protection Agency has promulgated 40 CFR Parts 9 and 63, which are national emission standards for ethylene oxide commercial sterilization and fumigation operations, which mandates emissions to be less than 1 ppm. The compliance date is December 1997.

A common source of VOC's is from sterilizer units where gaseous chemicals are used for sterilizing products such as plastic, rubber or the like, which cannot withstand heat sterilization. Also, the sterilizing agents or sterilant are commonly used in the fumigation of spices and antiques, and for sterilizing medical devices. Sterilization is complete when a sterilant kills or inactivates the contaminating microorganism. The most common sterilant or sterilizing agent is EO.

In the past, industry had used a combination of EO and carbon dioxide or Freon 12 to reduce the volatile nature of EO. The common mixture was 12% by weight of EO and 88% by weight of Freon 12. Sterilization utilizing the combination of EO and Freon 12 required pressures up to 30 psia in order to achieve concentrations of EO in the range of 500–800 milligrams/liter, which was the concentration required to sterilize a product. Environmental problems caused by Freon 12, a CFC (chlorinated fluorocarbon), has forced contract sterilizer operators to use a nitrogen purge cycle and 100% EO. The 12/88 systems are still used in hospitals and clinics where the volume of gas release is small when compared to contract operations. This invention cannot be utilized for Freon/EO mixes. Oxidation of Freon produces highly acidic compounds which are not environmentally desirable.

What is needed is a system and method that uses residual VOC's as an oxidant and fuel in combustion which yields non-hazardous byproducts. The present invention permits energy to be generated as a result of oxidation in an internal combustion engine. Whereas, in the prior art, recovery or disposal of VOC's required a use of energy with no usable or useful output. These and other needs are satisfied by the present invention.

SUMMARY OF THE INVENTION

The present invention is a system and method for oxidation of residual volatile organic compounds which is stored or held in a suitable storage structure. The volatile organic compound stored in the structure is taken into the intake port of an operating internal combustion engine wherein the operating and internal combustion engine reduces the volatile organic compounds into carbon dioxide and water which appears in the exhaust gases of the operating engine.

A further object of the present invention is to provide an internal combustion engine which operates to reduce residual VOC to a non-hazardous state.

A still further object of the present invention is to use a VOC as an oxidant and fuel in combustion, which yields non-hazardous byproducts.

An additional object of the invention is to have an internal combustion engine operate to reduce a residual VOC to a non-hazardous state and have the engine operatively connected to an electric generator, where electricity is generated.

A further additional object of the invention is to have a cooling jacket surrounding the engine which absorbs heat and transfers the heat to a system requiring heat such as, for example, a sterilizing unit.

Still another additional object of the present invention is to have a gas chromatograph monitor the chemical composition of the exhaust from the engine.

Yet still another additional object of the invention is to have a heat exchanger connected to the exhaust port of the engine and to a water supply to generate steam which steam may then be delivered to a system requiring steam such as, for example, a sterilizing unit where the steam is used for preconditioning of the product to be sterilized and also in the sterilization processes.

Still another object of the present invention is to reduce VOC's in a cost effective manner, with respect to the initial investment and maintenance costs.

A yet further object of the invention is to have a method for oxidation of residual volatile organic compounds.

These and other advantages and features, which characterize the invention, are set forth in the claims annexed hereto and forming a further part hereof. However, for a better understanding of the invention, and the advantages and objectives obtained by its use, reference should be made to the Drawing Figures, and to the accompanying descriptive matter, in which there is described a preferred embodiment of the invention.

DETAILED DESCRIPTION OF THE INVENTION

Figure 2:
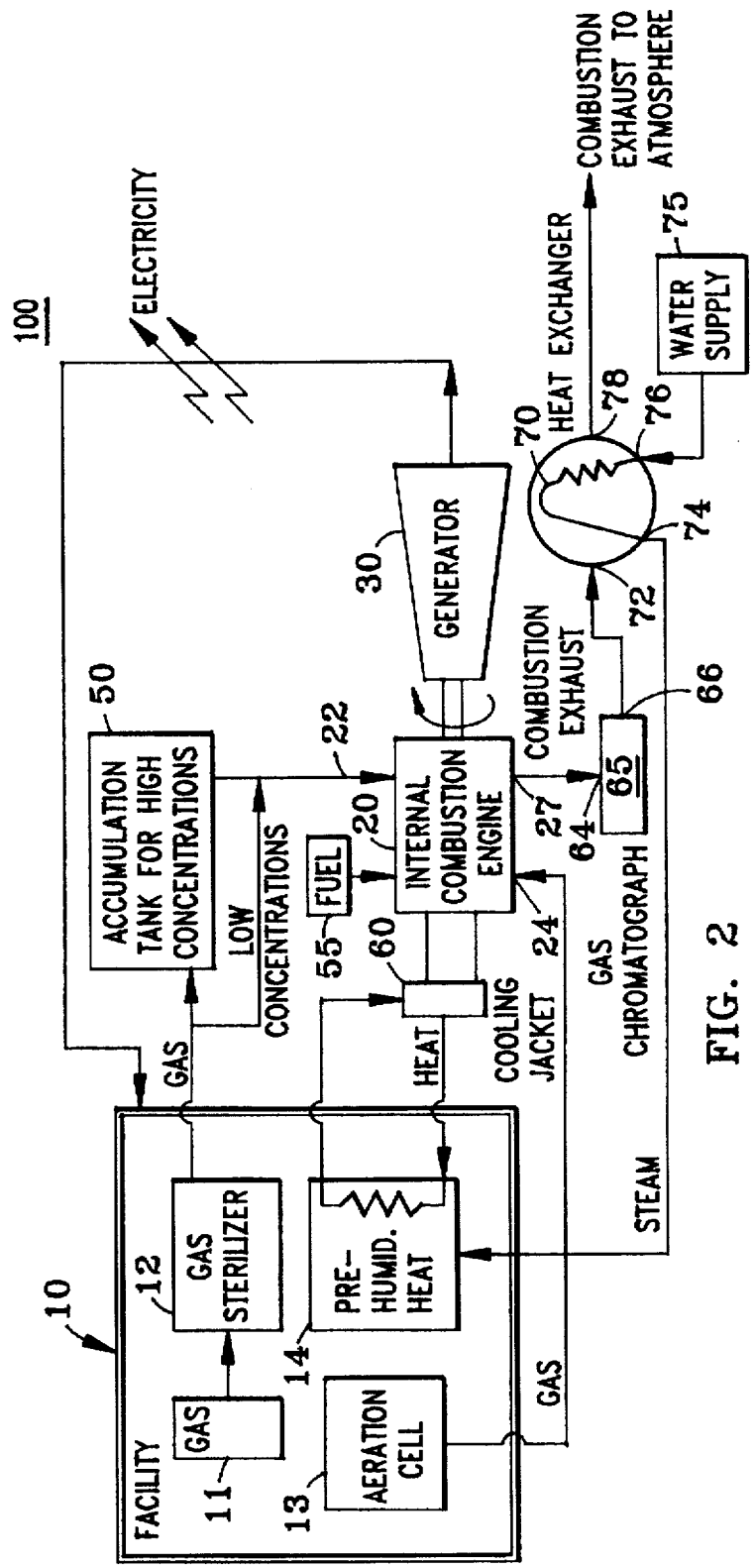
FIG. 2 is a schematic representation of the invention, including ancillary components such as an electric generator, heat exchanger and gas chromatograph.

Referring to the drawings, wherein like numerals represent like parts throughout the several views, there is generally disclosed at 100 a system consistent with the principles of the present invention, depicted in FIG. 2.

Although the example of sterilization process 10 is connected to system 100 will be discussed herein, those skilled in the art will appreciate that such application is only one of many in which the principles of the present invention might be utilized. Accordingly, the sterilization process 10 in conjunction with system 100 herein should not be construed in a limiting manner.

Those skilled in the art will appreciate that other VOC producing processes may be connected to system 100 in order that VOC's are used as an oxidant and fuel in combustion, which yields non-hazardous byproducts.

In order to better present and describe the preferred embodiment of the present invention, the detailed description of the process will be deferred pending a discussion of the preferred embodiment of system 100.

Figure 1:
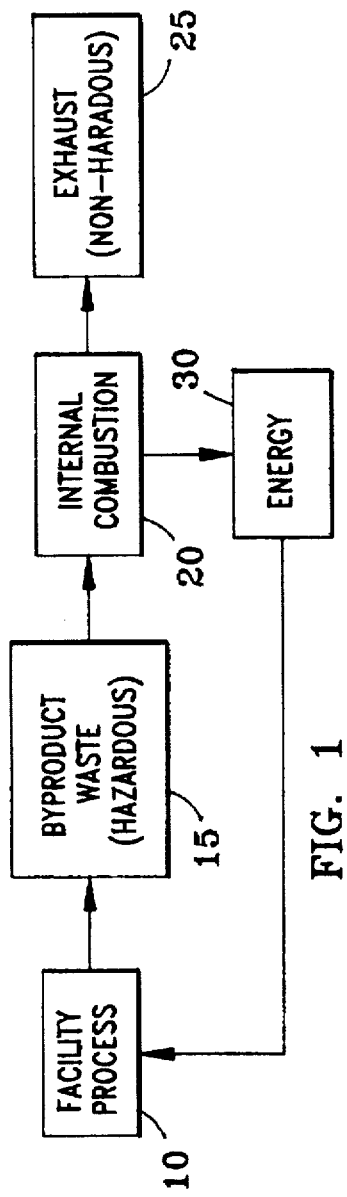
FIG. 1 is a basic schematic representation of the present invention.

Referring to FIG. 1, depicts a basic representation of the invention having a facility process 10 which has a hazardous byproduct 15. The byproduct 15 is introduced to an internal combustion device 20 having a non-hazardous exhaust 25 that is released to the environment. Also, internal combustion device 20 enables the generation of energy 30 which may be utilized in facility process 10.

Facility process 10 may be any process that produces a hazardous byproduct 15 that contains VOC's; for example a sterilization process which has EO as a hazardous byproduct 15 is used in this discussion. Other processes whose byproduct contains VOC's of a similar nature can utilize this process.

Referring to FIG. 2, a schematic representation of system 100, including possible ancillary components is shown. The components are an accumulation tank 50, fuel source 55, cooling jacket 60, generator 30, gas chromatograph 65, heat exchanger 70 and a water supply 75. The components may be used in conjunction with facility process 10. Although it has been proven that the combustion process will work with extremely high concentrations of EO, it is this inventors opinion that, for the sake of safety and consistency in the process, mixtures containing high levels of EO (above 10%) be accumulated and fed into the engine at a moderate rate.

Facility process 10 (which facility process may be a gas sterilizer unit) may have the following elements such as an aeration cell 13, preconditioning unit 14, gas sterilizer 12 and gas supply 11. A discussion of a typical sterilization process will describe the interaction and details of each element.

A preconditioning unit 14 is a unit in which a non-sterile product is exposed to humidity and heat. The controlled preconditioning of the product helps ensure the maximum effectiveness of the EO. Thereafter, the product is transferred to a gas sterilizer 12, where it is exposed to the sterilant (commonly EO), which is from gas supply 11. The preconditioning stage typically occurs in atmospheric pressure where the static penetration of heat and humidity into the product occurs. The static penetration and preconditioning cycle typically requires 24 hours.

The sterilization cycle required a vacuum in the range of 25 inches of mercury (inHg) and maximum pressures of 14 pounds per square inch absolute (psia). Subsequent to the sterilization cycle, the sterile product is transferred to an aeration cell 13 to complete a degassing cycle. The degassing cycle function is to remove residual sterilant (EO) from the product by introducing heated air into the area. This mix of EO and air can be fed directly into the engine's intake system, or the engine could be allowed to take all its intake air from the aeration cell.

The sterilization process requires a series of vacuums followed by nitrogen purges of the chamber. Thereafter, 100% EO is injected into sterilizer unit 12. The sterilization process typically requires eight hours to complete. The amount of EO is controlled so that the pressure is less than atmospheric, such that the unit functions under vacuum and not as a pressure vessel.

A discussion will follow in regards to the components of system 100 which are an accumulation tank 50, fuel source 55, cooling jacket 60, generator 30, gas chromatograph 65, heat exchanger 70 and a water supply 75.

After the sterilization process is complete the VOC's are evacuated from the sterilizer unit 12 and contained in an accumulation tank 50. The accumulation tank 50 preferably has a volume of 1000 cubic feet, but may be any size that is appropriate to the particular facility process 10. Accumulation tank 50 will have the appropriate construction and safety features for utilization in the storage of a hazardous material.

Accumulating tank 50 further includes an instrumentation and process control scheme for delivering the volatile organic compounds to engine 20 at a predetermined rate. The instrumentation is rated and installed for the appropriate division/classification, which is hazardous. Both the instrumentation and process control schemes are common in the art and are well known to those skilled in the art.

Figure 3:
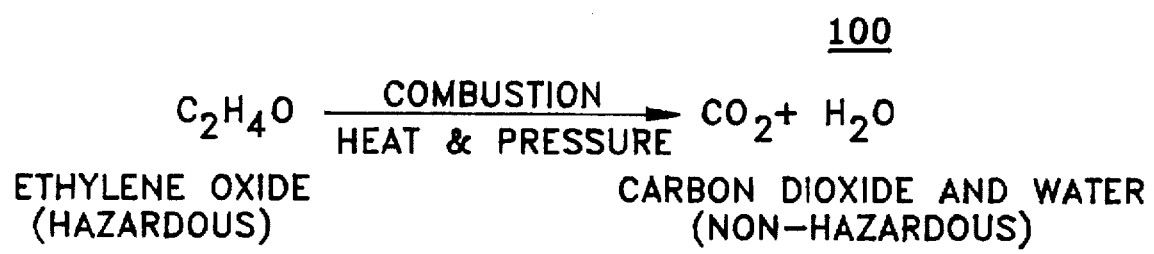
FIG. 3 is a simplified reaction formula, depicting how a VOC is used as an oxidant and fuel in combustion which yields non-hazardous byproducts.

An internal combustion engine 20 having a first intake 22 is connected to accumulation tank 50. The operation of internal combustion engine 20 reduces the VOC's into carbon dioxide and water. The chemical reaction that occurs is depicted in FIG. 3, where EO is exposed to combustion, heat, and pressure resulting in carbon dioxide and water. First intake 22 is any connection that will effectively and safely permit the flow of VOC's into engine 20.

Engine 20 may be diesel, gasoline, LP or Natural Gas fueled, and should be large enough in size to allow its air intake to absorb the flow requirements of the sterilization and degassing waste products. Engine 20 may be adapted to operate primarily on gasoline, diesel and other fuel sources which are well known in the art. Other variations to the engine are considered to be within the scope and principles of the present invention.

A fuel supply 55 is connected to engine 20 and is used to contain fuel. Fuel supply 55 is typically a tank or container of sufficient volume as is appropriate for the effective operation of engine 20. Fuel supply 55 is well known in the art and may take many forms, which are consistent with the scope of the present invention.

Engine 20 may include a second intake 24 which is connected to an aeration cell 13 of facility process 10. A second VOC is transmitted from aeration cell 13 to a second intake 24 of internal combustion engine 20. The operation of engine 20 reduces the VOC's into carbon dioxide and water. Second intake 24 is preferably the same configuration as first intake 22. Also, within the scope of the present invention is where second intake 24 and first intake 22 are the same element.

Engine 20 may further include a cooling jacket 60, which surrounds and is proximate to an exterior portion of engine 20. Cooling jacket 60 absorbs heat generated engine 20. The heat is then transmitted into facility process 10 and more particularly in preconditioning unit 14.

An electric generator 30 may be operatively coupled to an output of engine 20. The operation of engine 20 enables electric generator 30 to produce electricity. The electricity may be transmitted back to facility process 10. Electric generator 30 preferably generates electricity that is the same voltage, frequency as utilized by facility process 10.

A gas chromatograph 65 having a first end 64 connected to an exhaust port 27 of engine 20. The operation of engine 20 produces an exhaust, where gas chromatograph 65 monitors the chemical components of the exhaust. Gas chromatograph 65 may be configured to signal when a deviation from a minimum predetermined level of a specified chemical composition is detected. The preferable gas chromatograph 65 is manufactured by Baseline MSA, however, there are many variations available which are consistent with the scope of the present invention.

System 100 may further include a heat exchanger 70 and liquid supply 75. Heat exchanger 70 having a first output 74 and second output 78 and a first input 72 and second input 76, where first input 72 is connected to a second end 66 of gas chromatograph 65 and second input 76 is in fluid connection with liquid supply 75. Heat exchanger 70 is sized and configured to produce steam as result of the exhaust being diverted into first input 72 of heat exchanger 70, and first output 74 is where steam is transmitted back to facility process 10. Second output 78 is where nonhazardous exhaust is released to surrounding atmosphere.

Where the type of engine used is a diesel type of engine it is necessary that the engine be operated with a load so that the engine exhaust temperature is sufficiently high to cause combustion of the particular VOC being treated. It is logical to use the engine's output for the generation of electricity and the engines waste heat, (cooling and exhaust), to run the sterilization facility. There is also an abundance of power available. This allows the utilization of high pressure filtration devices, or cooling and compression devices which could further increase the concentration of the dilute EO and make it possible to operate a smaller power unit to achieve the same results.

The process where an internal combustion engine operates to reduce a residual VOC to a non-hazardous state is discussed. The oxidation of VOC's includes a step of recovering the VOC's from facility process 10 and containing the VOC in a safe manner, such as in accumulation tank 50.

Thereafter, transmitting the VOC's to internal combustion engine 20 through first intake 22. Regulating the VOC's flow into internal combustion engine 20 is accomplished by the appropriate process controls and instrumentation. The controls and instrumentation are well known to those skilled in the art.

The reduction the volatile organic compounds into carbon dioxide and water is completed by operating internal combustion engine 20. Engine 20 may be operatively coupled to a generator 30, where electricity is produced by the operation of engine 20.

A cooling jacket 60 may be utilized to absorb heat from engine 20. The heat may be conducted to facility process 10 and in particular to preconditioning unit 14.

The exhaust from internal combustion engine 20 flows through a gas chromatograph 65, where the chemical composition is monitored and may be recorded. Any deviation from a minimum predetermined level of a specified chemical composition can result in signaling an alarm.

Heat exchanger 70 may be utilized in producing steam from flowing the exhaust from internal combustion engine 20 through heat exchanger 20. The steam may be diverted to facility process 10 and in particular to preconditioning unit 14. A step of releasing the exhaust to surrounding atmosphere in a non-hazardous state is a function of system 100.

As a further embodiment of the invention the exhaust from internal combustion engine 20 can be utilized as a primary or as a supplemental means for oxidation of the VOC's by thermal ignition. The VOC is fed directly into exhaust stream of engine 20 which runs at a temperature of 1100° F. to 1300° F. if engine 20 is fully loaded. The autoignition temperature of ethylene oxide is 1060° F. thus it ignites upon being introduced into the exhaust stream and is converted to carbon dioxide and water.

While there have been described what are at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

I claim:

1. A system used for oxidation of volatile organic compounds comprising:

means for containing said volatile organic compounds; and means for delivering under pressure said volatile organic compounds to a first intake of an internal combustion engine, said internal combustion engine further comprising a second intake connected to an aeration cell of a sterilizing unit, wherein a second volatile organic compound is transmitted from said aeration cell to a second intake of said internal combustion engine, wherein operation of said internal combustion engine reduces said volatile organic compounds into carbon dioxide and water.

2. A system used for oxidation of volatile organic compounds comprising:

means for containing said volatile organic compounds; and means for delivering under pressure said volatile organic compounds to a first intake of an internal combustion engine, said internal combustion engine further comprises a cooling jacket, said cooling jacket surrounds and is proximate to an exterior portion of said internal combustion engine, wherein heat absorbed by said cooling jacket is transferred to a sterilizing unit, wherein operation of said internal combustion engine reduces said volatile organic compounds into carbon dioxide and water.

3. A system used for oxidation of volatile organic compounds comprising:

means for containing said volatile organic compounds;

means for delivering under pressure said volatile organic compounds to a first intake of an internal combustion engine wherein operation of said internal combustion engine reduces said volatile organic compounds into carbon dioxide and water;

a gas chromatograph having a first end connected to an exhaust port of said internal combustion engine where operation of said internal combustion engine produces an exhaust, said gas chromatograph monitors chemical components of said exhaust; and a heat exchanger and a liquid supply, said heat exchanger having a first output and second output and a first input and second input, where said first input is connected to a second end of said gas chromatograph and said second input is in fluid connection with said liquid supply, said heat exchanger is sized and configured to produce steam as a result of said exhaust being diverted into said first input of said heat exchanger, said second output of said heat exchanger is where nonhazardous exhaust is released to surrounding atmosphere.

4. A system used for oxidation of volatile organic compounds comprising:

means for containing said volatile organic compounds; and means for delivering under pressure said volatile organic compounds to a first intake of an internal combustion engine, said internal combustion engine further comprising a second intake connected to an aeration cell of a sterilizing unit, wherein a second volatile organic compound is transmitted from said aeration cell to a second intake of said internal combustion engine, said second volatile organic compound is ethylene oxide wherein operation of said internal combustion engine reduces said volatile organic compounds into carbon dioxide and water.

5. A method for oxidation of volatile organic compound comprising the steps of:

recovering said volatile organic compound;

containing said volatile organic compound in an accumulation tank;

transmitting under pressure said volatile organic compound to an internal combustion engine;

operating said internal combustion engine, wherein operation of said internal combustion engine reduces said volatile organic compounds into carbon dioxide and water; and conducting heat from said internal combustion engine to a sterilizing unit.

6. A method for complete oxidation of residual volatile organic compound comprising the steps of:

recovering said volatile organic compound;

containing said volatile organic compound in an accumulation tank;

transmitting said volatile organic compound to an internal combustion engine;

operating said internal combustion engine;

regulating said volatile organic compounds flow into said internal combustion engine;

generating electricity by operation of a generator operative connected to said internal combustion engine;

conducting heat from said internal combustion engine to a sterilizing unit;

monitoring chemical composition of the internal combustion engine's exhaust;

signaling when a deviation from a minimum predetermined level of a specified chemical composition is detected; and releasing said exhaust to surrounding atmosphere in a non-hazardous state, wherein operation of the internal combustion engine reduces said volatile organic compounds into carbon dioxide and water.

* * * * *